(12) United States Patent
Stehle et al.

(10) Patent No.: US 10,109,072 B2
(45) Date of Patent: Oct. 23, 2018

(54) VIEW CLASSIFICATION-BASED MODEL INITIALIZATION

(71) Applicant: KONINKLIJKE PHILIPS N.V., Eindhoven (NL)

(72) Inventors: Thomas Heiko Stehle, Hamburg (DE); Juergen Weese, Norderstedt (DE); Irina Wachter-Stehle, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/770,871

(22) PCT Filed: Mar. 17, 2014

(86) PCT No.: PCT/IB2014/059877
§ 371 (c)(1),
(2) Date: Aug. 27, 2015

(87) PCT Pub. No.: WO2014/147542
PCT Pub. Date: Sep. 25, 2014

(65) Prior Publication Data
US 2016/0012596 A1   Jan. 14, 2016

Related U.S. Application Data

(60) Provisional application No. 61/803,822, filed on Mar. 21, 2013.

(51) Int. Cl.
*G06T 7/73* (2017.01)
*G06K 9/62* (2006.01)
(Continued)

(52) U.S. Cl.
CPC .............. *G06T 7/73* (2017.01); *G06K 9/46* (2013.01); *G06K 9/52* (2013.01); *G06K 9/6205* (2013.01);
(Continued)

(58) Field of Classification Search
CPC .......... G06K 9/46; G06K 9/52; G06K 9/6205; G06K 9/6267; G06T 3/00; G06T 7/0012;
(Continued)

(56) References Cited

U.S. PATENT DOCUMENTS 7,141,020 B2    11/2006  Poland et al.
8,891,881 B2 *  11/2014  Gupta ................. A61B 8/0866
                                                        382/128

(Continued)

FOREIGN PATENT DOCUMENTS

JP    H10124677 A      5/1998
JP    2009178423 A  *  8/2009    ............. G06K 9/342
JP    2009178423 A     8/2009

OTHER PUBLICATIONS

Lee et al. "Model-based detection, segmentation, and classification for image analysis using on-line shape learning", Machine Vision and Applications, Feb. 2003, vol. 13, Issue 4, pp. 222-233.*

(Continued)

*Primary Examiner* — Katrina Fujita

(57) ABSTRACT

An image processing apparatus and related method. The apparatus (PP) comprises an input port (IN), a classifier (CLS) and an output port (OUT). The input port is capable of receiving an image of an object acquired at a field of view (FoV) by an imager (USP). The image records a pose of the object corresponding to the imager's field of view (FoV). The classifier (CLA) is configured to use a geometric model of the object to determine, from a collection of pre-defined candidate poses, the pose of the object as recorded in the image. The output port (OUT) is configured to output pose parameters descriptive of the determined pose.

13 Claims, 5 Drawing Sheets

(51) Int. Cl.
*G06K 9/46* (2006.01)
*G06K 9/52* (2006.01)
*G06T 3/00* (2006.01)
*G06T 7/00* (2017.01)
*G06T 7/168* (2017.01)

(52) U.S. Cl.
CPC .............. *G06K 9/6267* (2013.01); *G06T 3/00* (2013.01); *G06T 7/0012* (2013.01); *G06T 7/168* (2017.01); *G06T 7/75* (2017.01); *G06T 2200/04* (2013.01); *G06T 2207/10136* (2013.01); *G06T 2207/20061* (2013.01); *G06T 2207/20076* (2013.01); *G06T 2207/20081* (2013.01); *G06T 2207/20112* (2013.01); *G06T 2207/30048* (2013.01)

(58) Field of Classification Search
CPC .. G06T 7/168; G06T 7/73; G06T 7/75; G06T 2200/04; G06T 2207/10136; G06T 2207/20061; G06T 2207/20076; G06T 2207/20081; G06T 2207/20112; G06T 2207/30048
See application file for complete search history.

(56) References Cited

U.S. PATENT DOCUMENTS

| | | | |
|---|---|---|---|
| 2005/0190972 A1* | 9/2005 | Thomas | G06K 9/209 382/218 |
| 2008/0260254 A1* | 10/2008 | Schramm | G06K 9/6205 382/190 |
| 2013/0028517 A1 | 1/2013 | Yoo et al. | |
| 2015/0026643 A1* | 1/2015 | Weese | G06F 19/321 715/825 |
| 2015/0310581 A1* | 10/2015 | Radulescu | H04N 7/18 348/77 |

OTHER PUBLICATIONS

Peters et al., "Optimizing boundary detection via Simulated Search with applications to multi-modal heart segmentation", Medical Image Analysis 14 (2010) 70-84.*
Definitions for "pose" and "attitude", Dictionary.com Unabridged. Retrieved Mar. 24, 2017 from Dictionary.com.*
Lee et al. "A fast and robust approach for automated segmentation of breast cancer nuclei." In Proceedings of the IASTED International Conference on Computer Graphics and Imaging. 1999.*
Machine translation of JPH10124677.*
Ecabert, O. et al. "Automatic model-based segmentation of the heart in CT images", IEEE Transactions on Medical Imaging, 27(9), 2008.
Ballard, D.H., "Generalizing the Hough transform to detect arbitrary shapes", Pattern Recognition, 13(2), pp. 111-122, 1981.
Saalbach, A. et al, "Optimizing GHT-Based Heart Localization in an Automatic segmentation Chain", MICCAI, 6893, 463-470, 2011.
Fischler, M.A. et al. "Random Sample Consesus: A Paradigm for Model Fitting with Applications to Image Analysis and Automated Cartography". Communications of the ACM, vol. 24(6), 1981.
Aschkenasy, S.V. et al. "Unsupervised Image Classification of Medical Ultrasound Data by Multiresolution Elastic Registration", Ultrasound in Med. & Biol., vol. 32, No. 7, pp. 1047-1054, 2006.
Criminisi, A. et al. "Regression Forests for Efficient Anatomy Detection and Localization in CT Studies", MICCAI 2010 Workshop MCV, LNCS 6533, pp. 106-117, 2011.
Ecabert, O. et al. "Towards Automatic Full Heart Segmentation in Computed-Tomography Images", Computers in Cardiology 2005; 32:223-226.

* cited by examiner

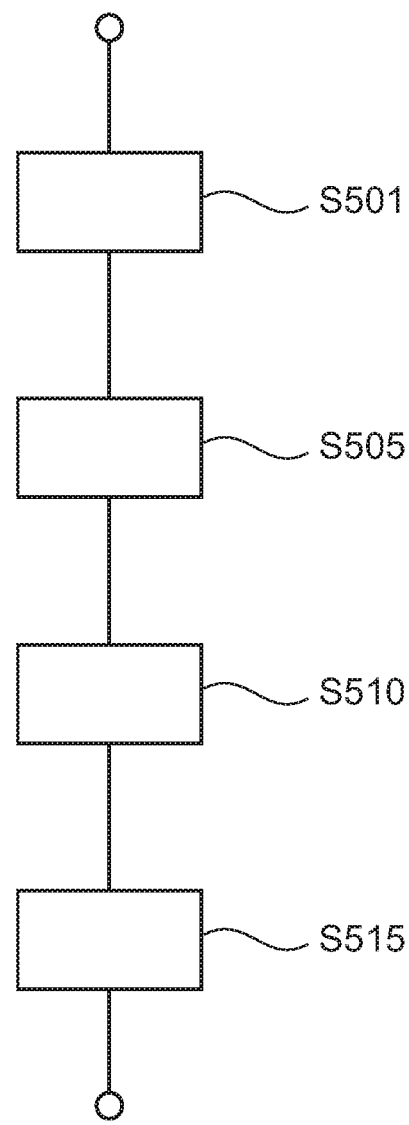

VIEW CLASSIFICATION-BASED MODEL INITIALIZATION

CROSS-REFERENCE TO PRIOR APPLICATIONS

This application is the U.S. National Phase application under 35 U.S.C. § 371 of International Application No. PCT/IB2014/059877, filed on Mar. 17, 2014, which claims the benefit of U.S. Provisional Application No. 61/803,822, filed on Mar. 21, 2013. These applications are hereby incorporated by reference herein.

FIELD OF THE INVENTION

The present invention relates to an image processing apparatus, to an image processing method, to a computer program element and to a computer readable medium.

BACKGROUND OF THE INVENTION

The reliance on high quality imagery is prevalent in the medical field although examples from other fields such as non-destructive material testing, geology or baggage screening for security checks may also be cited in this respect. What is particularly challenging is the acquisition of high quality images of "hidden" objects not readily accessible for visual inspection. For instance, in the medical field clearly defined images of internal organs are an important diagnostic tool. Specifically, in 3-dimensional transesophagal echocardiography (3D TEE), 3D ultrasound imaging equipment is used to acquire ultrasound image volumes of a patient's heart. Applicant's U.S. Pat. No. 7,141,020 describes a 3D ultrasound system. Other imaging modalities such as a CT scanner are also frequently used. Images acquired by those imaging modalities may be post-processed to help better identify the anatomic information encoded therein. Such post processing includes image segmentation. Segmentation allows to clearly define which part of the image are representative of the human or animal heart or other object of interest. It has been found however that, in certain situations, the segmentation results are unreliable.

SUMMARY OF THE INVENTION

There may therefore be a need for an apparatus to address the above noted or similar deficiencies.

The object of the present invention is solved by the subject matter of the independent claims where further embodiments are incorporated in the dependent claims. It should be noted that the following described aspect of the invention equally apply to the image processing method, to the computer program element and to the computer readable medium.

According to a first aspect of the present invention there is provided an image processing apparatus, comprising:

an input port for receiving an image of an object acquired at a field of view by an imager, the image recording a pose of the object corresponding to the imager's field of view;

a classifier configured to use a geometric model of the object to determine, from a collection of pre-defined (candidate) poses, the pose of the object as recorded in the image;

output port configured to output pose parameters descriptive of the determined pose.

According to one embodiment, image processing apparatus further comprises a segmenter configured to use the pose parameters as initialization information to segment the image for the object at the estimated pose. Model-based segmentation relies on a proper initialization of a geometric model which is used in the segmenter's algorithm. However, when the organ's pose is subject to change because of anatomical variability or changing imaging geometry (such as in 3D TEE in contrast to CT where there is barely any change in imaging geometry), prior knowledge based standard initialization fails. The apparatus as proposed carries out a view based classification and subsequently uses this information in one embodiment for a segmentation of the object which may be an organ of interest. In other words, the apparatus is capable to detect automatically the pose of the organ to be segmented with respect to a reference pose. The pose includes in particular a position of the object and its orientation with respect of the model at the reference pose. The pose parameters established by the classifier describe this position and orientation. The pose parameters are then used in one embodiment to initialize the segmentation processing pipeline, in particular to initialize the model to be used in the segmentation. Pose parameters may be supplied in different forms for instance as a matrix for a transformation related to the pose.

In one embodiment, the transformation is applied to the model to produce a transformed model in the "right" pose that corresponds to the pose of the object as recorded in the image. In this embodiment, the established pose parameters allow adapting the model to the pose of the object as recorded in the image. In yet another embodiment the transformation is applied to transform the image. Supplying the pose parameters in different forms allows adapting the proposed apparatus to the internal algorithmic functioning of a given segmenter. In this way the proposed apparatus can be use as an "add-on" for existing segmenters.

In one embodiment the apparatus operates automatically without user input during operation on the image. The estimated pose parameters are automatically forwarded to the segmenter for the initialization. In a semi-automatic embodiment, the output pose parameters are displayed on a screen for verification by a human expert. For instance, the model may be transformed using the pose parameters to the established pose and is then displayed on the screen for user inspection. The apparatus may operate on a sequence of images as supplied by the imager during an imaging session. In this embodiment, the apparatus outputs a corresponding sequence of pose parameters, each for use in a separate segmentation initialization of the respective image in the sequence.

In one embodiment, the model is a surface mesh in 3D that outlines the shape of the object. In one embodiment the mesh is made up of interconnected triangular elements however other meshes may also be used such rectangular/square element meshes or meshes made up of NURBS (non-uniform rational b-splines) surfaces.

According to one embodiment the classifier uses a generalized Hough transform (GHT) to determine the object's pose. Each of the pre-defined poses is associated with a point in the (Hough) parameter space of the GHT. According to one embodiment the GHT is based on a plurality of separate Hough accumulators, each dedicated to a different one of the pre-defined poses. In other words the different orientations are not adjoined to form a single accumulator. In this way, CPU time can be saved without compromising accuracy because the computations scale only linearly with the number of different orientations. More specifically and according to one embodiment, pose is defined as position and orientation of the object as recorded in the image. Each accumulator per pose is a separate data structure that records the counts, per position in Hough space, of how many image points correspond to that specific Hough space point. In one embodiment prevalent poses (orientations or positions) are learned in a training phase from training images. In an alternative embodiment, the roles of pose position and pose orientation are reversed, that is, the separate accumulators are per position and the respective entries record the correspondence with respect to orientations.

Using certain quality measures, the accumulators can be compared to find the one that fits the image best with respect to the measure. Establishing the best fitting accumulator then determines the sought after orientation and entries in the best fitting accumulator are used to establish the position which, together with the orientation, define the sought after pose parameters. Based on the pose parameters, an affine transformation (or other type of transformation) can then be determined which transforms the geometrical model such that it can be used as starting point for model based segmentation as mentioned earlier. According to one embodiment, the quality measure is the maximum over all accumulator entries. According to one embodiment a weighted maximum is used for instance to attribute different weights to entries from different accumulators. In the embodiment where the different accumulators represent different orientations, the weighted maximum amounts to a weighting of the different orientations. Entropy measures are envisaged in some embodiments, where the entropy in a neighborhood around each maximum entry per accumulator is evaluated and the accumulator with the maximum entry with the greatest entropy is returned. Again, the maximum may be taken as the absolute, "plain" maximum or as a weighted maximum as mentioned above.

According to a different embodiment the image processing apparatus comprises an identifier configured to identify one (but general more) landmarks in the image. Each pre-defined pose is associated with a transformation. The classifier is operative to use at least one (but in general two or more) of the transformations to respectively transform coordinates of the identified landmarks and to compare the transformed landmark coordinates with coordinates of landmarks of the model. Based on a similarity measure a transformation of a best fit is established from among the at least two transformations. The pose parameters describe the pose associated with said transformation of best fit. In one embodiment the pose parameter is the transformation of best fit and may be applied to the model to adapt same to the image as mentioned earlier above.

According to one embodiment the classifier operates to generate a scout transformation from the image to the model. The scout transformation is based on i) coordinates of the identified landmarks in the image and ii) coordinates of target landmarks in the model. The classifier is configured to compare, based on a similarity measure, the scout transformation with one (but in general two or more) of the pre-defined transformations to so establish a transformation of a best fit and the output pose parameters describe the pose associated with said transformation of best fit. Again, similar as in the previous embodiment, the pose parameter may be supplied in the form of the transformation of best fit and may be applied to the model to adapt same to the image.

According to one embodiment the classifier uses a set of weights that reflect an expected spatial relationship between the imager's position relative to the object to be imaged when the imager is in use. This allows further improving the accuracy of the pose parameters. In a Hough transform embodiment with multiple accumulators, said weights for the imager-object spatial relationship can be used to define yet another embodiment of a quality measure for comparing accumulators. In this embodiment, the maximum entry is taken over weighted accumulators. Entries from accumulators that represent poses in line with the expected spatial imager-object relationship are preferred, so have a higher weight attached than entries from other accumulators.

The apparatus can be used in a variety of segmentation tasks for modalities where the pose of an organ in the image data set is not known. Equivalently, the apparatus can be used in modalities for which the origin and the orientations of the coordinate axes are not fixed or known beforehand. An example for such modalities is TEE ultrasound imaging where the exact probe position and orientation is not known. According to one embodiment the imager is a 3D ultrasound probe and the image is a 3D date volume acquired by said probe. It may also be understood that the output pose parameters may also be used for image processing tasks other than segmenting where a knowledge of an object' pose in an image data set is required.

BRIEF DESCRIPTION OF THE DRAWINGS

Exemplary embodiments of the invention will now be described with reference to the following drawings wherein:
FIG. 5 shows a flow chart of an image processing method.

DETAILED DESCRIPTION OF EMBODIMENTS

Figure 1:
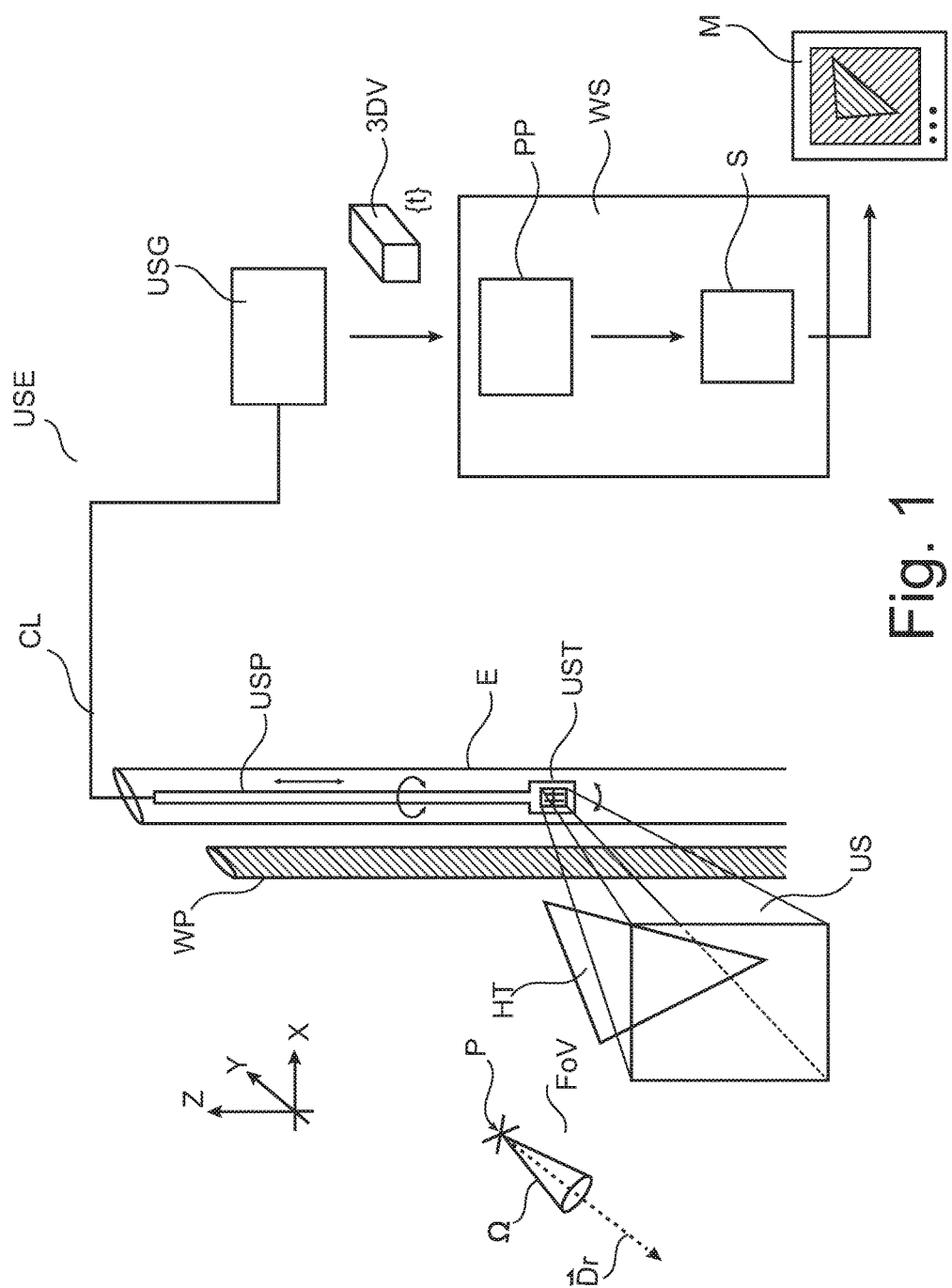
FIG. 1 shows an arrangement for image based intelligence gathering.

With reference to FIG. 1, there is shown an arrangement for image based intelligence gathering in a medical context.
More specifically, FIG. 1 shows an arrangement for 3D TEE.
The 3D TEE arrangement includes, in its basic components, 3D ultrasound equipment USE and a work station WS along with a monitor M.
As will be explained in more detail below, the US (ultrasound) equipment USE allows obtaining images of the human or animal heart HT. US equipment is communicatively coupled to the work station WS. After a given image has been acquired by the imager, it is then forwarded to work station WS and stored in a memory. The image can then be image-processed by work station WS in a manner described below. In one embodiment, workstation WS runs a graphic display generator that is suitable to render the acquired/processed images for display on monitor M.
Ultrasound equipment USE includes controller USG and ultrasound probe USP coupled to the probe USP via a communication line CL. Ultrasound probe USP terminates at its operating end in an ultrasound transducer UST. In one embodiment transducer head UST includes an array of acoustic elements (for example piezo-electric elements).
To the left of FIG. 1 is shown how said ultrasound equipment USE is used to obtain heart images. After administration of a tranquilizer or similar to the patient, US probe USP is carefully introduced into the patient's gullet (esophagus) E and forwarded until the transducer UST, comes to lie at about the height of the heart. 3D TEE harnesses the anatomic fact that inside the gullet, at the appropriate height therein, transducer UST can be positioned very close to the heart and it is then only esophagus E wall tissue and the windpipe WP that is interposed in between transducer UST and the heart. Obstruction by disturbing tissue such as bone, muscles, fat and so on as would be the case for more traditional examinations (such as x-ray) can be therefore obviated with 3D TEE.

In order to maximize image based information gathering the probe USP is so arranged that its tip portion, that is the transducer UST enjoys a multitude of degrees of freedom. For instance, with respect to a frame of reference whose Z axis is assumed to pass through a longitudinal axis defined by the esophagus E, transducer UST can be forwarded or retracted in longitudinal direction along said Z direction. It can also be rotated around an axis of rotation along the Z axis. Furthermore, according to one embodiment, USP probe includes a string mechanism (not shown) with which flexure of the transducer head UST can be effected, in other words, the string mechanism allows flexing the head away from the horizontal Z axis to either side of said axis.

In use during the actual image acquisition, a circuitry in controller USG operates so that acoustic energy can be delivered at transducer UST in the form of pulse acoustic waves. The waves form a cone US and define a volume insonified at any one instance. The term "cone" is used therein in the broad mathematical sense to include not only classical circular cones but in particular pyramids. In one embodiment the transducer UST is "omniplane", in other words, the transducer's array may be operated to effect a rotation of the cone US, each angular rotation defined by a different plane thereby adding yet another degree of freedom. Yet further, in one embodiment it is also the imaging "depth" of the cone (along the cone US's main propagation direction) that can be controlled.

The probe USP's transducer is configured to transmit ultrasound pulsed waves which are then bouncing off structures in the patient's anatomy. The probe is further configured to register the bounced off waves as incoming echo sound waves and a processor in the controller USG calculates the travel time of said incoming echo waves to form a 3D ultrasound image data volume at the instant propagation direction at a specific time instant t. During the intervention, the propagation direction is likely to change a number of times so that ultrasound equipment USD outputs a sequence of 3D volumes $3DV_t$ taken at different field of views $FoV_t$. The US equipment USD as envisaged herein allows acquiring the instant 3D volume 3DV at a single probe position, so no movement of the probe by hand or otherwise is needed for any given 3D volume 3DV. However, use of other, more traditional ultrasound scanners are also envisaged herein where the 3D volume is reconstructed after insonification of the volume of interest from many different propagation direction that are each obtained by moving by hand or otherwise the scanner so as to sweep out the volume.

Conceptually, the imager's field of view (FoV) as afforded by the cone US can be defined by an instantaneous position P of head UST in space relative to the common frame of reference, by a solid angle $\Omega$ specifying the "width" of field of view, and by a viewing direction Dr and viewing orientation. Said viewing orientation can defined by a vector orthogonal to the viewing direction d to so define the concepts of "up"/down" or "left/right" for the view. The pose in which the heart is recorded is a direct function of these FoV parameters. More specifically the instantaneous field of view FoV of the transducer UST defines a certain perspective view on the object of interest, in this case the heart HT. In other words each 3D volume 3DV encodes a specific pose of the heart. Yet in other words, each 3D volume 3DV records a pose of the heart HT. A pose defines a position of the heart HT in the image coordinate system and an orientation therein. In general, the shape or external boundary of the image portion that defines the perspective view associated with the respective of FoV the transducer is different for different 3D volume blocks.

Desirable as the large number of degrees of freedom of the transducer head UST may be, this also adds a layer of complexity. This is because the respective heart poses as recorded in the sequence of 3D volumes 3DV (and as supplied by the ultrasound equipment USE to the work station) is in general not known a priori. That is, after a given volume 3DV has been acquired by the imager, there is in general no automatic way to tell the specific pose as recorded in each respective volume. This pose variability may make image processing of said images prone to errors.

The work station WS may include a number of different modules to aid image-processing the 3D US images. Apart from including digitalizers (which may in one embodiment be performed by suitable A/D convertors in the US equipment itself) and digital filter modules, the WS includes in one embodiment a segmenter S.

Segmenter module S allows "breaking up" the image 3DV into one or more image portions that represent the organ of interest HT. In other words, segmenter S is an image processing tool that operates on pixels and voxels (in this case voxels) of the image 3DV to establish whether a given voxel does or does not belong to the image portion of interest. The segmented image may then be forwarded to image analysis tools further downstream the image processing pipeline. For instance, in segmenting the 3D image volumes 3DV for the heart, instantaneous heart volumes across the sequence of 3D volume blocks can be established. It can be ascertained whether the cardiac activity of the patient is sound. For instance, the heart volumes can be compared across the sequence of 3D image volumes to identify different cardiac phases. Heart insufficiencies can be recognized by this comparison of subsequent heart volumes. It can therefore be appreciated that an exact segmentation may be of interest.

Briefly and as proposed herein, the work station WP includes a preprocessor PP that serves in one embodiment as an initializer for segmenter S. For instance, in one embodiment the segmenter S is a model based segmentation (MBS) unit that relies on prior knowledge of position and orientation of the object to be segmented. The pre-processer or segmentation initializer PP as proposed herein reads in one or more 3D volumes, estimates the poses of the object and then forwards this information, in one embodiment, to the segmenter where the respective 3D volume can be more accurately segmented because now the object's pose is known.

More specifically, preprocessor PP as proposed herein fully automatically analyses the image data and operates to classify the current view, that is, the view at which the current image block 3DV has been acquired. In other words, preprocessor PP is capable of detecting the pose of an organ to be segmented with respect to a reference pose. The detected pose can be expressed by "pose parameters". The parameters describe a transformation, that is, how a geometric model of the heart HT needs to be shifted and rotated so that the so transformed model corresponds to the pose a recorded in the image. Based on this pose parameters, points of the geometric model MOD for the organ are then transformed in one embodiment to the so estimated ("current") pose. In one embodiment the geometric model MOD of the heart is defined as a 3D surface mesh made up of triangular elements, the mesh roughly outlining a standard heart shape in a given reference pose. The so transformed (that is, shifted and rotated) model is then supplied as a starting point for an MBS of the image volume 3DV. In other embodiments, it is only the estimated pose information that is fed into the segmenter so in this embodiment the pose parameters are passed direct to the segmenter without first transforming the model MOD. In yet another embodiment, the transformation defined by the estimated pose information is applied to the instant image volume 3DV and it is the so transformed image volume that is supplied to the segmenter for segmentation now using the original (that is, not transformed) model MOD as the initialized model. This embodiment allows adapting the model MOD to the image 3DV by transforming the image instead of the model MOD, thereby effecting the same pose as in the previous embodiment where, conversely, it is the model MOD that is transformed relative to the image.

Pre-processor PP relies in one embodiment on the Generalized Hough Transform (GHT) with a plurality of accumulators (one for each orientation). In another embodiment, extraction of landmarks from the image data 3DV is used to determine from a plurality of affine (or other) transformations an optimal one that best "explains" the structures in the instant image 3DV.

Figure 2:
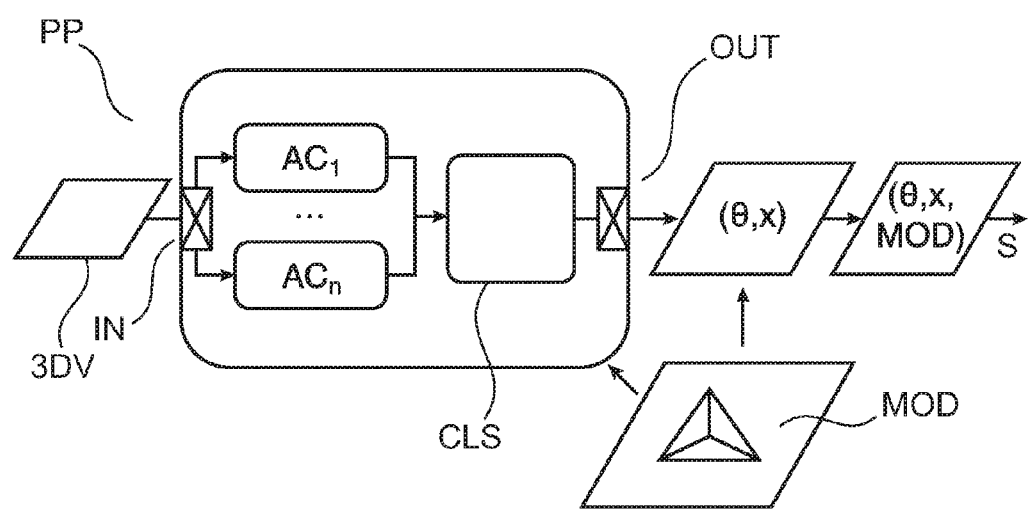
FIG. 2 shows one embodiment of an image processer as used in FIG. 1.
Figure 3:
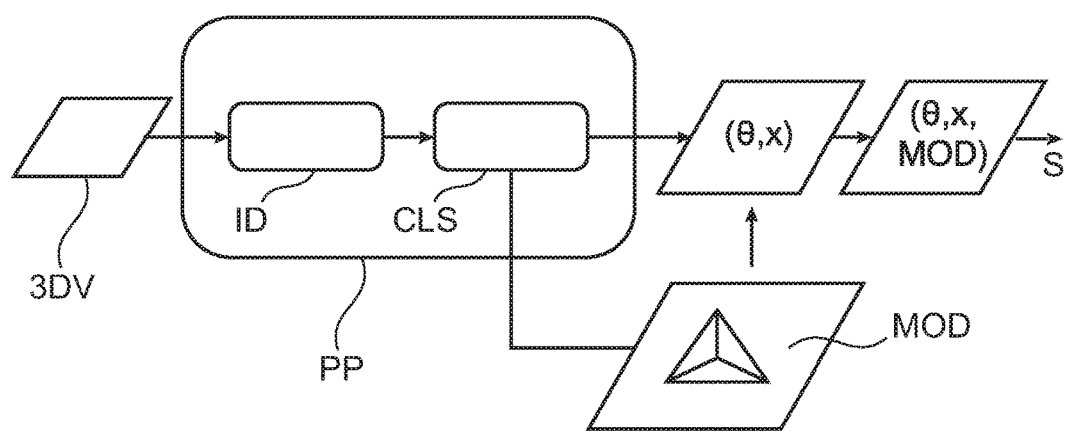
FIG. 3 shows a second embodiment of an image processer as used in the system of FIG. 1.

Reference is now made to FIGS. 2 and 3 where respective embodiments of segmentation initializer PP are shown by way of schematic block diagrams.

Turning first to the embodiment in FIG. 2, pre-processor PP includes an input port IN for receiving the 3D image 3DV and a classifier CLS. There is also an output port OUT for outputting the pose parameters ($\beta$[=orientation], x[=position]) of the pose as determined by classifier CSL. This pose information ($\beta$, x) may then be applied, as mentioned above, to the geometric model MOD. The so transformed model forms the "initialized model". Either the so transformed model MOD or (without applying the transformation first) the triple ($\beta$,x,MOD) can then be supplied via a suitable back-end to the segmenter S. The segmenter is thereby initialized, that is, segmenter S "knows" the pose of the object it is to segment for. In one embodiment, operation of segmenter S is based on an algorithm similar to O. Ecabert et al's "Automatic model-based segmentation of the heart in CT images", IEEE Transactions on Medical Imaging, 27(9), 2008. In this embodiment, the segmenter, once the pose of the object of interest in the to-be segmented image is known (that is, the initialized model is available) applies parameterized and deformable adaptation steps to the model MOD. The model MOD is thereby adapted to the instant image volume 3DV. Specifically, the adaptations include one or more stages where the model MOD's coordinates are adapted to the image 3DV by applying successively a global rigid, a global affine, a multi-rigid, and a deformable transformation. After deforming the initialized model, grey value intensities across normals of the mesh model's MOD faces (in one embodiment triangles are used) are evaluated to define the boundaries of the segmentation.

According to one embodiment, processor PP's classifier CLS is based on the Generalized Hough Transform GHT. See for instance D. Ballard's, "Generalizing the Hough transform to detect arbitrary shapes", Pattern Recognition, 13(2), pp 111-122, 1981. According to one embodiment the Hough Transform includes a plurality of different, dedicated "accumulators" $AC_1$-$AC_n$ one for each orientation (of the object HT pose) as will be explained in more detail below. The functioning of the pre-processor PP with respect to the first embodiment will be explained with reference to two phases: a previous training or preparatory phase and the subsequent operational phase.

Briefly, to cope with the strongly varying heart pose in the images $3DV_t$, frequently re-occurring pose orientations are learned in the training phase from training 3D images and, after clustering, a set of transformations is computed from those orientations. The transformations are then applied in the operational phase during the GHT voting process to fill the plurality of Hough accumulators. The plurality of Hough accumulators is then searched for the maximum voting entry across all the Hough accumulators to find the heart pose. Said search may run concurrently across all Hough accumulators or the search may proceed sequentially.

According to one embodiment, advantage is taken of certain invariants/constraints that are imposed by the cardiac imaging setup, namely, that the position of the left atrium can be expected to be located at about the apex of the ultrasound cone US.

In the following, the relevant 3D-GHT algorithm is described in more detail. Furthermore extensions to incorporate prior knowledge from the imaging geometry are described.

Figure 4:
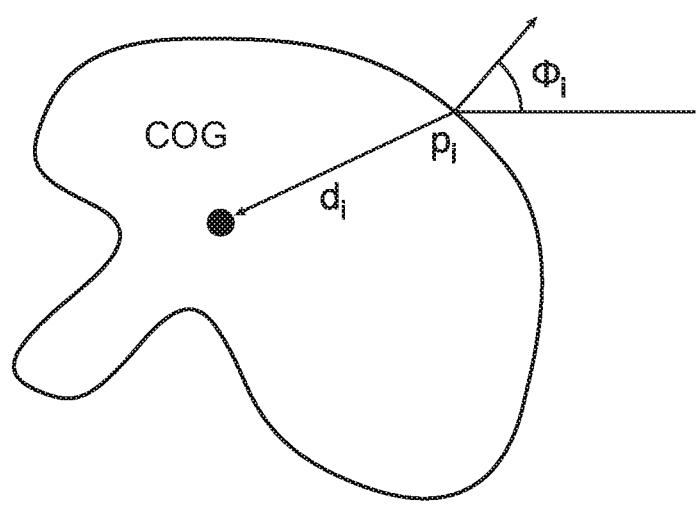
FIG. 4 shows a parameterized description of a shape.

Preprocessor PP uses a 3D extension of the GHT. In GHT, a "template" of a shape (and as defined by the model MOD) of the object HT to be detected is used. With reference to FIG. 4, for ease of representation a 2D illustration of the relevant quantities for capturing the model's MOD shape is given. For each point p of the model's boundary, the angles $\varphi$ and $\theta$ between the coordinate axes and the contour's normal vector are determined. For each dimension $\varphi$ and $\theta$, a discretization ("binning") into N×M intervals is carried out such that a set (matrix) of N×M pairs ($\varphi$, $\theta$) of angular intervals is generated. A "difference vector" d between any one contour point p and the point COG which represents the model's location is stored in a table which relates the pairs angular intervals to the respective difference vector d. The object's location can be measured with respect to the template shape's center of gravity COG or another suitable reference point. Preferably a symmetry of the template shape can be used to keep the shape description simple. In other words, each entry in the table represents one possible pose. In the language of GHT, the shape so recorded is the so-called R-table ("Reference table"). A non-limiting example of an R-table is given in the following table:

| discretized angular ranges for $\varphi\varphi$, $\theta$ | contour vector d to reference point COG |
|---|---|
| $0 \leq \varphi < \Delta\varphi, 0 \leq \theta < \Delta\theta$ | $\{d|\varphi \in [0, \Delta\varphi[, \theta \in [0, \Delta\theta[ \}$ |
| $0 \leq \varphi < \Delta\varphi, 0 \leq \theta < 2\Delta\theta$ | $\{d|\varphi \in [0, \Delta\varphi[, \theta \in [\Delta\theta, 2\Delta\theta[ \}$ |
| ... | ... |
| $0 \leq \varphi < \Delta\varphi, (N - 2) \leq \theta < (N - 1)\Delta\theta$ | $\{d|\varphi \in [0, \Delta\varphi[, \theta \in [(N - 2)\Delta\theta, (N - 1)\Delta\theta[ \}$ |
| $\Delta\varphi \leq \varphi < 2\Delta\varphi, 0 \leq \theta < \Delta\theta$ | $\{d|\varphi \in [\Delta\varphi, 2\Delta\varphi[, \theta \in [0, \Delta\theta[ \}$ |

During R-table generation, not only model MOD contour information as of FIG. 2, is used but also a training image I is taken into account. In other words, contour points are added to the R-table only if the image gradient $\nabla I$ at the respective image position p is greater than some user adjustable threshold t:

$$\|\nabla I(p)\| > t \quad (1)$$

As similar training process is described by Saalbach et al in "Optimizing GHT-Based Heart Localization in an Automatic Segmentation Chain", MICCAI, 6893, 463-470, 2011.

Put differently, the R-table is a representation of the model MOD with edge points as captured in the training image accounted for.

In the operational phase, the R-table is used in the following shape detection step as follows: a so-called Hough accumulator H is generated as follows. First, according to one embodiment, the image 3DV (this and the following steps are understood to be applicable to any volume block in the sequence $3DV_t$ so in the following reference is made to "the" image 3DV) is filtered by a gradient filter to detect "edge points". For each edge element e with a gradient having an absolute value greater than t, the angles $\varphi_j$ and $\theta_k$ with respect to the coordinate axes are determined. A look-up in the R-table yields a set of difference vectors from the contour point to the object's expected center of gravity. So, for all difference vectors d in the respective R-table entry the Hough accumulator is increased by one:

$$H(e+d_i)+=1 \ \forall d_i \in R\text{-table}(\varphi_j,\theta_k) \tag{2}$$

After cycling though the image 3DV's edge points and applying the recordations as of (2) in the Hough accumulator (in general a "hypermatrix"), the coordinates (as of the R-table) of the Hough accumulator entry with the highest count is taken to represent, according to one embodiment, the most probable object location for a given pose orientation β.

However, the approach as of (2) above still does not as such allow detecting the shape in orientations β different from the one it was trained on. One option would be to increase the degrees of freedom of the above GHT by adding or adjoining new dimensions to the Hough accumulator where the new parameters are quantized over an interval of interest to capture the various orientations β. In contrast and very much unlike such an adjoining approach, it is proposed herein not to use an interval of parameter ranges, but an explicit "link" between some select, discrete parameter orientation combinations β and additional Hough accumulators. That is, for each orientation β, a different, separate Hough accumulator is used that is dedicated to only a respective one of the various orientations. This approach allows searching for different orientations whilst keeping the computational burden low (that is, the complexity grows merely linear in the number of orientations). In yet other words, all possible shape orientations β may be considered to form a "phase space". It is then proposed herein to "plant" at different (unconnected) points in said "phase space" the respective ones of the accumulators, each accumulator being a "localized" shape descriptor "pegged" to the respective orientation β.

The set of orientations β (which is in general a multidimensional variable) is learned from the training data set as briefly mentioned above. Semi-automatic segmentation is used to generate a roughly correct segmentation. Each segmentation with orientation $O_l$ is registered rigidly onto a reference orientation yielding a transformation matrix $T_{O_l}$. In one embodiment, the orientations were clustered such that, even when starting the model-based segmentation from a slightly wrong or different orientation, a successful segmentation would still be possible for the respective data set. By this "coarsening", the total number of orientations can be reduced to computationally more manageable one. That is operating Eq. (2) now becomes $$AC_{l=1,\ldots,n}=H_{O_l}(e+T^{-1}_{O_l}a??d_i)+=1 \ \forall d_i \in R\text{-table}(\varphi_j,\theta_k) \tag{3}$$

and the maximum value taken over all Hough accumulators $H_{O_l}$ now gives the most probable location and orientation of the heart in the image. According to one embodiment, instead of searching for the maximum entry value, a "maximizing" entry value is searched for. The maximizing entry is an entry (of one of the Hough accumulators) that maximizes a certain normalizing function defined on the collection of Hough Accumulators $AC_l$. The normalizing function allows normalizing across the different Hough accumulators to thereby account for the dependency of the Hough accumulator entries on the different orientations β represented by each of said Hough accumulators. For instance, if it is merely the "plain" maximum value that is searched for in the simpler embodiment mentioned above, the following situation may occur: if a certain orientation happens to afford a view of only half of the heart HT, then the maximum value entry in the respective Hough accumulator would be typically lower than a maximum value entry of another Hough accumulator whose orientation represents a full heart view. The normalizing function would therefore allow compensating for this orientation dependency of the Hough accumulator entries to achieve better cross-accumulator comparison.

To further improve robustness, in one embodiment advantage if taken of certain invariants that are respected due to the imaging setup. For example, in 3D TEE the left atrium is always located at the frustum tip. To take advantage of this, the GHT is modified to no longer vote for the center of gravity, but for the atrium center whose position can be expected to vary little. Additionally, a weighting factor w is introduced in one embodiment $$w(x) = \begin{cases} 1, & \|a-x\| < t_2 \\ \max(1-(\|a-x\|) \cdot \Delta w, 0), & \text{otherwise} \end{cases} \tag{4}$$

which does not affect Hough accumulator values near the known frustum (cone US) tip location.

In (4), a is the center of the atrium (or any other anatomic or otherwise known location) and Δw is a weighting factor decrease rate. So, the expression $$(x,0)=\arg \max_{x,O_l} w(x)a??H_{O_l}(x) \tag{5}$$

yields the estimated pose, that is, the most "probable" estimated location and orientation and takes prior knowledge on the imaging setup into account. In other words, each accumulator $H_{O_l}$ (for each coarsened orientation $O_l$) is queried for its maximum entry but is at the same time weighted down or penalized if the location as returned by an R-table look-up appears "off" with respect to a where the frustum is supposed to be located and is favored if close to a.

According to one embodiment, and prior to the above mentioned GHT steps (that is in the preparatory phase), one or more adaptation steps are applied to the image volume 3DV to normalize grey value intensities as recorded by the image 3DV voxels.

As training data, ten full-volume sequences from different patients were selected. In these data, the whole heart was located inside of the frustum. The first frame of each sequence was segmented manually. These ten volumes were used to train the features for boundary detection as later (that is, during the operational phase) used in the MBS algorithm of the segmenter S. For the remaining frames of the sequence, the deformable adaptation steps of the MBS segmentation framework is used to generate automatic segmentations (so-called pseudo ground truth). The pseudo ground truth was inspected and corrected where necessary. Furthermore, all meshes were registered rigidly to one reference mesh such that the R-table comprises one orientation only. In sum, a set of 350 ultrasound volumes was used for GHT training, i.e., for R-table generation. For further 251 sequences, pseudo ground truth was generated. From the first frame of these sequences, transformations $T_{O_i}$ were extracted and they were stored according to the data set's omniplane angle. To reduce the number of transformations, a clustering of similar transformations has been carried out. It suffices to then consider only a cluster representative to cover other remaining members of the respective cluster. This way, the number of orientations $\beta$, and therewith, the number of transformations could be reduced to 1-7 per omniplane orientation.

In sum, operation of pre-processor PP according to FIG. 2 allows to reliably recognize heart anatomy in TEE volumes despite the strong variability of the heart's pose. It is based on the 3D-GHT which has been modified such that special properties of 3D-TEE are taken into account. Orientations were learned and clustered to enlarge the Hough space only by as much as necessary. Furthermore, a Hough accumulator weighting is used in one embodiment to include prior-knowledge on the imaging geometry into the pose classification.

Preprocessor PP algorithm can be used to automatically generate anatomically meaningful views in TEE volume data sets. For example, a section through the volume can be generated to provide a four chamber view or a small volume of interest can be sectioned from the whole ultrasound image and can then be displayed in a selective volume rendering.

The components of PP are envisaged resident on work station WS running as software routines. The components may be programmed in a suitable scientific computing platform such as Matlab® or Simulink® and then translated into C++ or C routines maintained in a library and linked when called on by work station WS. In alternative embodiments, the components of PP are arranged as separate modules in a distributed architecture and connected in a suitable communication network.

The components may also be arranged as dedicated FPGAs or as hardwired standalone chips.

With reference to FIG. 3, a further embodiment of the segmentation pre-processor PP is now described in the following. The overall architecture is similar to the embodiment in FIG. 2 but now pre-processor PP includes a landmark identifier ID.

Landmark identifier ID operates to detect/indentify one or more anatomic landmarks in the image 3DV. Landmark detection in the image may be based in one embodiment on the RANSAC (Random Sample Consensus) algorithm as described in M. Fischler et al's "Random Sample Consensus . . . ", Communications of the ACM, Volume 24(6), 1981. The collection of the so detected landmarks may then be taken to represent a skeleton of the underlying geometric model MOD of the heart HT when assumed to be in a certain pose. The model MOD is assumed to include landmark target points representing the landmarks therein.

In this embodiment, operation of classifier CLS is based on a collection of affine transformations $T_j$. The transformations $T_i$ are applied one by one to the detected landmark points to effect a coordinate transformation of the detected landmarks.

The so transformed landmarks can then be compared with the reference geometric model MOD. In particular, the transformed landmark points in the image are compared with the target landmark points of the model MOD. The model MOD is assumed to be given with respect to a reference orientation. For each transformation, the coordinates of the transformed landmarks are then compared with the coordinates of the model MOD. The coordinates of the transformed landmarks that fit best (for instance, are closest to with respect to a suitable norm) the target point landmarks of the reference model MOD are then identified. The respective transformation that yielded said best fit or match between transformed landmark points and target landmark points is then considered to represent the pose as recorded in the underlying image 3DV.

Each of the predefined affine transformations can be thought to encode a certain pose. In particular, each affine transformation includes among other components (such as shearing) a translation and a rotation component that describe a respective one of the poses. In one embodiment, a description of the translation and rotation components of the identified best fit transformation is forwarded to the segmenter S to initialize same. Alternatively, the best fit transformation is directly applied to the model first, and it is the so transformed model that is then forwarded to initialize the segmenter.

According to a different embodiment of FIG. 3, the coordinates of the identified landmarks and the coordinates of the target landmarks of the model MOD are used to define a "scout" transformation. That is, the scout transformation maps the indentified landmarks in the image to the target landmarks in the model MOD. The scout transformation is then checked for similarity with the each of the pre-defined affine transformations. The affine transformation that best fits (that is, is most similar to) said scout transformation is then considered to encode the sought after pose in the image 3DV. Translation and rotation components as encoded by the best affine transformation can then be forwarded as pose descriptive information to the segmenter or said affine transformation is applied to the model MOD and the transformed model is then used to initialize the segmenter as in the previous embodiment of FIG. 3.

In either of the above embodiments, the "best" fit is established with respect to a similarity measure. Also "best" is meant to include being within a user definable margin rather being closest in the arithmetical sense although some embodiments indeed envisage "best" to mean proximal in the arithmetical sense. Computing the best fit with respect to a pre-set margin allows saving CPU time because the processor need not cycle through all pre-defined transformations to evaluate the similarity measure. As soon as a similarity value that lies within the margin has been established, the output unit returns the respective transformation as the "best fit". Suitable similarity measures include matrix norms of the respective difference matrix, e.g., the Frobenius norm.

Furthermore, in the embodiments of FIG. 3 above, transformations other than affine may be used. For instance rigid body transformation (with or without scaling) may be used or a linear transformation may be used in some embodiments.

With reference to FIG. 5, there is shown a flow chart of an image processing method.

In step S501 an image (such as a 3D image volume supplied by a 3D ultrasound imager or other modality) is received. The image has been acquired at a certain field of view by the imaging modality. As a consequence of the respective field of view at the instant of acquisition, the image records a pose of an organ of interest so the pose is a function of the imager's (instantaneous) field of view. The pose itself is assumed not to be known a priori.

At step S505 a geometric model of the object to be imaged is used to determine, from a collection of pre-defined poses, an estimated pose of the object as recorded in the image.

At Step S510 pose parameters are output that are descriptive of the determined estimated pose. The pose parameter includes in particular position and orientation of the image portion representative of the object in the image. In other words, the pose parameters describe how the model needs to be transformed (in particular to be shifted and rotated) so that the transformed model is adapted to the pose in the image.

At Step S515 the pose descriptive parameters are used to initialize a segmentation so as to segment the image for the object at the estimated pose. In other words, because of the initialization the segmenter now "knows" i) at which position in the image and ii) along which orientation the image is to be segmented for.

According to one embodiment the classification or the determination step at S505 is based on a generalized Hough transform.

In an alternative embodiment no GHT is used. In this alternative embodiment, step S505 includes a step of identifying a plurality of landmarks in the image. If the object is the human heart, suitable landmarks include the center of the mitral valve, the center of the aortic valve, or the apex. Coordinates of the collection of the identified landmarks are then transformed by each of a pre-defined set of transformations and the transformed landmark coordinates are examined for consistency with coordinates of target landmarks of the object model.

Alternatively, the identified landmark coordinates and the coordinates of the target landmark of the object model are used to construct a scout transformation that maps the identified landmark coordinates onto coordinates of the target landmarks. The scout transformation is then examined for similarity with each of pre-defined set transformation.

The most consistent one the pre-defined transformations or the most similar one of the transformations is then deemed to represent the estimated pose. The most consistent one of the pre-defined transformations or the most similar one of the transformations is then used to transform the model and the transformed model can then be used at step S515 for the segmenter initialization.

The geometric model is stored in a suitable data structure in memory for ready access. For instance, list-pointer variable structures can be used to represent vertices, edges and faces. According to one embodiment the geometric model is chosen as a surface mesh of triangular elements to model the shape of the human or animal heart but it is understood that for other objects of interest other shape-appropriate geometric models are to be used.

Those skilled in the art will appreciate that although the above has been described with reference to a 3D ultrasound imager, the apparatus and method as described herein may also be used with other imaging modalities. Also, the pose descriptive information as computed herein may be put to use in imager processors other than segmenters.

Those schooled in the art will also appreciate that the above two embodiments with respect to the generalized Hough transform or collection of transformations in connection with the landmarks are mere embodiments of the imaging apparatus and method as proposed herein. Other transformations, in particular the classical Hough Transform, may also be used in some instances.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An image processing apparatus, comprising:
   an input port for receiving a three-dimensional image of an object acquired at a field of view by an imager, the image recording a pose of the object corresponding to the imager's field of view;
   a classifier module configured to determine, from a collection of pre-defined poses, an estimated pose of the object recorded in the image using a three-dimensional geometric model of the object,
   wherein the classifier module uses a generalized Hough transform (GHT) to determine the estimated pose, each of the pre-defined poses is associated with a point in a Hough parameter space of the GHT, and wherein the GHT comprises a plurality of separate Hough accumulators, each Hough accumulator is dedicated to a different one of the pre-defined poses,
   wherein each pre-defined pose of the object comprises a pre-defined position and a pre-defined orientation of the object; and
   an output port configured to output a pose parameter descriptive of the estimated pose.

2. The image processing apparatus of claim 1, further comprising:
   a segmenter module configured to segment the image for the object at the estimated pose using the pose parameters as initialization information.

3. The image processing apparatus of claim 1, further comprising:
   an identifier module configured to identify at least one landmark in the image, each pre-defined pose is associated with a transformation, the classifier module operative to use at least one of the transformations to transform coordinates of the identified landmark and to compare the transformed landmark coordinates with coordinates of at least one target landmark of the model to so establish, based on a similarity measure, from among the transformations, a transformation of a best fit, wherein the pose parameter is descriptive of the pose associated with said transformation of best fit.

4. The image processing apparatus of claim 1, further comprising:
   an identifier module configured to identify landmarks in the image, each pre-defined pose is associated with a transformation, the classifier module operative to generate a scout transformation from the image to the model, the scout transformation based on i) coordinates of the identified landmarks in the image and ii) coordinates of target landmarks in the model, the classifier module further configured to compare, based on a similarity measure, the scout transformation with at least one of the pre-defined transformations to so establish a transformation of a best fit, wherein the pose parameter is descriptive of the pose associated with said transformation of best fit.

5. The image processing apparatus of claim 1, wherein the classifier module uses a set of weights that reflect an expected spatial relationship between the imager's position relative to the object to be imaged when the imager is in use.

6. The image processing apparatus of claim 1, wherein the imager is a 3D ultrasound probe and the image is a 3D data volume acquired by said probe.

7. A non-transitory computer readable medium having stored thereon a computer program element for controlling an apparatus according to claim 1 which, when being executed by a processing unit, is adapted to perform method steps.

8. The image processing apparatus of claim 1, wherein the orientation of the object comprises a multidimensional rotation of the object with respect to a reference pose of the geometric model.

9. An image processing method comprising the steps of:
   receiving a three-dimensional image of an object acquired at a field of view by an imager, the image recording a pose of the object corresponding to the imager's field of view;
   using a three-dimensional geometric model of the object, determining, from a collection of pre-defined poses, an estimated pose of the object recorded in the image,
   wherein the estimated pose is determined by a generalized Hough transform (GHT), each of the pre-defined poses is associated with a point in a Hough parameter space of the GHT, and wherein the GHT comprises a plurality of separate Hough accumulators, each Hough accumulator is dedicated to a different one of the pre-defined poses,
   wherein each pre-defined pose of the object comprises a pre-defined position and a pre-defined orientation of the object; and
   outputting a pose parameter descriptive of the estimated pose.

10. The method of claim 9, further comprising:
    using the pose parameters as initialization information, segmenting the image for the object at the estimated pose.

11. The method of claim 9, further comprising:
    identifying at least one landmark in the image, each pre-defined pose associated with a transformation; and
    using at least one of the transformations to transform coordinates of the identified landmark and to compare the transformed landmark coordinates with coordinates of at least one target landmark of the model to so establish, based on a similarity measure, from among the transformations, a transformation of a best fit, wherein the pose parameter is descriptive of the pose associated with said transformation of best fit.

12. The method of claim 9, further comprising:
    identifying landmarks in the image, each pre-defined pose associated with a transformation;
    generating a scout transformation from the image to the model, the scout transformation based on i) coordinates of the identified landmarks in the image and ii) coordinates of target landmarks in the model; and
    comparing, based on a similarity measure, the scout transformation with at least one of the pre-defined transformations to so establish a transformation of a best fit, wherein the pose parameter is descriptive of the pose associated with said transformation of best fit.

13. The method of claim 9, wherein the determining the pose further comprises using a set of weights that reflect an expected spatial relationship between the imager's position relative to the object to be imaged when the imager is in use.

* * * * *